(12) United States Patent
Fang et al.

(10) Patent No.: US 11,544,970 B2
(45) Date of Patent: Jan. 3, 2023

(54) PAYMENT METHODS, PAYMENT SYSTEMS AND SERVICE SYSTEMS

(71) Applicant: ALIPAY (HANGZHOU) INFORMATION TECHNOLOGY CO., LTD., Zhejiang (CN)

(72) Inventors: Zhengye Fang, Hangzhou (CN); Xiao Zhan, Hangzhou (CN); Wenhu Wang, Hangzhou (CN)

(73) Assignee: Alipay (Hangzhou) Information Technology Co., Ltd.

( * ) Notice: Subject to any disclaimer, the term of this patent is extended or adjusted under 35 U.S.C. 154(b) by 0 days.

(21) Appl. No.: 17/358,373

(22) Filed: Jun. 25, 2021

(65) Prior Publication Data
US 2022/0028181 A1 Jan. 27, 2022

(30) Foreign Application Priority Data

Jul. 23, 2020 (CN) .......................... 202010716376.8

(51) Int. Cl.
*G06Q 20/18* (2012.01)
*G06Q 20/06* (2012.01)
(Continued)

(52) U.S. Cl.
CPC ......... *G07B 15/063* (2013.01); *G06Q 20/145* (2013.01); *G06Q 20/18* (2013.01);
(Continued)

(58) Field of Classification Search
CPC .................................................. G07B 15/063
See application file for complete search history.

(56) References Cited

U.S. PATENT DOCUMENTS 8,515,865 B1 * 8/2013 Marathe ................ B60L 53/665
705/39
2010/0156670 A1 * 6/2010 Hamilton, II .... G08G 1/096741
340/928

(Continued)

FOREIGN PATENT DOCUMENTS

CN 205862451 1/2017
CN 110046904 7/2019
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Joseph H Feild
*Assistant Examiner* — Pameshanand Mahase
(74) *Attorney, Agent, or Firm* — Fish & Richardson P.C.

(57) ABSTRACT

The present application provides payment methods and systems. One method comprising: receiving first identification data of a vehicle from a road side unit of an electronic toll collection (ETC) system, wherein the first identification data comprises identification information of the vehicle; receiving transaction data of a fuel dispenser, wherein the transaction data comprises information determined based on the fuel dispenser of a refueling fee of the vehicle; determining identity information of an owner of the vehicle; and transmitting the identity information and the information of the refueling fee to a server.

17 Claims, 9 Drawing Sheets

(51) Int. Cl.

| | |
|---|---|
| *G07B 15/06* | (2011.01) |
| *G06V 20/00* | (2022.01) |
| *G06Q 20/14* | (2012.01) |
| *G06Q 20/40* | (2012.01) |
| *G07F 13/02* | (2006.01) |
| *G08G 1/01* | (2006.01) |
| *G08G 1/017* | (2006.01) |
| *G06V 20/62* | (2022.01) |

(52) U.S. Cl.
 CPC ....... *G06Q 20/40145* (2013.01); *G06V 20/00* (2022.01); *G07F 13/025* (2013.01); *G08G 1/017* (2013.01); *G08G 1/0116* (2013.01); *G06V 20/625* (2022.01); *G06V 2201/08* (2022.01)

(56) References Cited

U.S. PATENT DOCUMENTS

| | | | | |
|---|---|---|---|---|
| 2010/0161481 | A1* | 6/2010 | Littrell | G06Q 20/127 705/40 |
| 2010/0274570 | A1* | 10/2010 | Proefke | B60L 53/67 705/1.1 |
| 2012/0191242 | A1* | 7/2012 | Outwater | B60L 53/30 700/236 |
| 2012/0262112 | A1* | 10/2012 | Ross | B60L 53/665 320/109 |
| 2015/0278788 | A1* | 10/2015 | Manuel | G06Q 20/327 705/21 |
| 2017/0032666 | A1* | 2/2017 | Pretorius | G08G 1/04 |
| 2021/0195411 | A1* | 6/2021 | Ratnakaram | H04L 63/0853 |

FOREIGN PATENT DOCUMENTS

| | | |
|---|---|---|
| CN | 110782539 | 2/2020 |
| CN | 111178291 | 5/2020 |
| CN | 111192372 | 5/2020 |
| CN | 111340473 | 6/2020 |
| CN | 111882752 | 11/2020 |
| EP | 1315129 | 5/2003 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2021/104886, dated Sep. 26, 2021, 12 pages.

\* cited by examiner

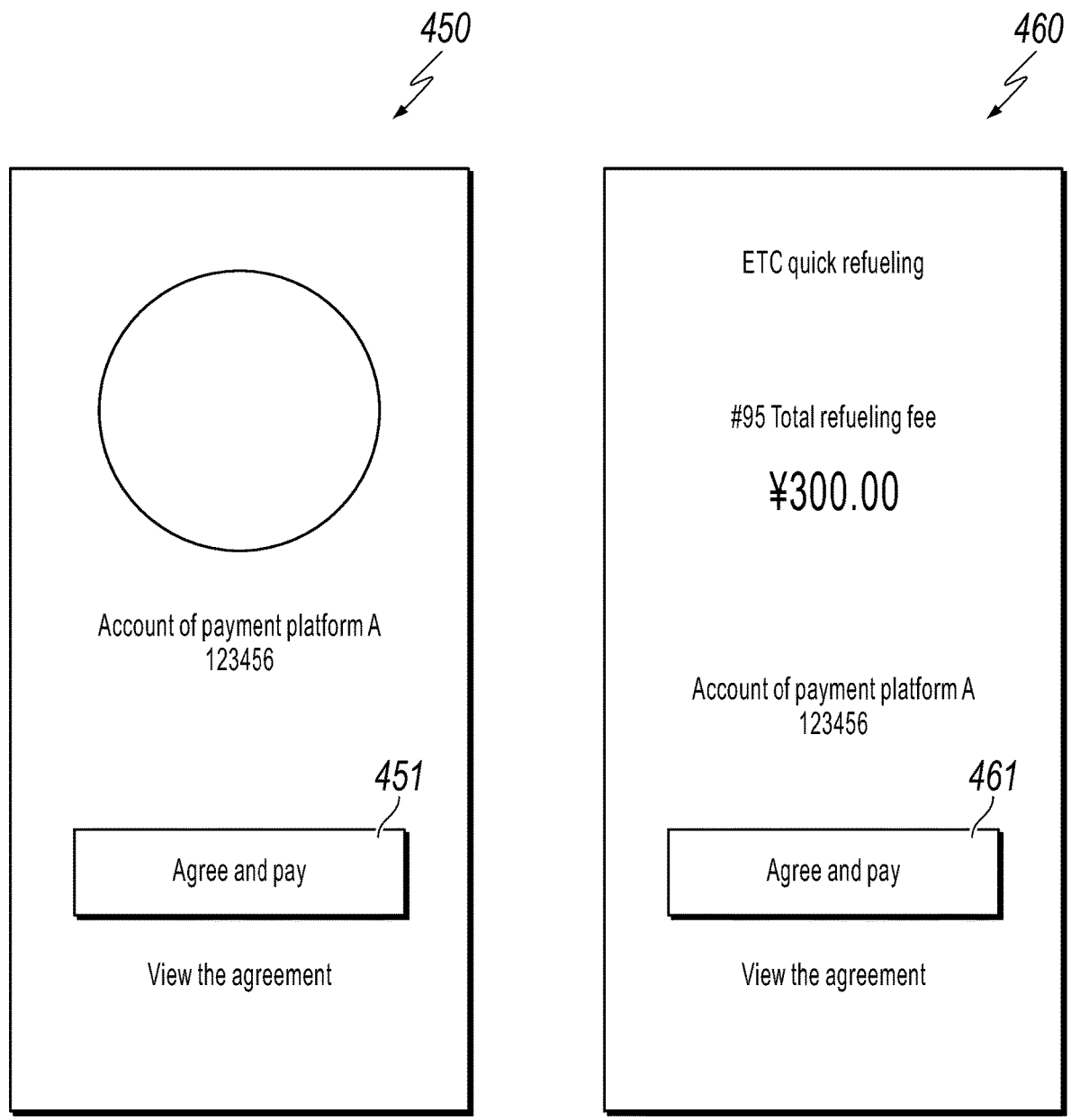

PAYMENT METHODS, PAYMENT SYSTEMS AND SERVICE SYSTEMS

CROSS-REFERENCE TO RELATED APPLICATIONS

This application claims priority to Chinese Patent Application No. 202010716376.8, filed on Jul. 23, 2020, which is hereby incorporated by reference in its entirety.

TECHNICAL FIELD

The present application relates to the field of information technologies, and in particular, to payment methods, payment systems and service systems.

BACKGROUND

Existing refueling payment methods generally include cash payment or fuel card payment in a lobby and code-scanning payment or point of sales (POS) payment in a back hall.

The existing refueling payment methods have defects such as follows: calculating and collecting changes for cash payment; the fuel card needs to be recharged for making payment, experience of the fuel card payment is poorer than that of electronic payment, and a payer needs to go to the back hall to get an invoice; while for the code-scanning payment or POS payment in the back hall, a user needs to get out of the vehicle and walk to the back hall, thereby decreasing circulation efficiency of gas stations, and resulting in traffic congestion.

SUMMARY

To solve defects of conventional refueling payment methods, the present application discloses payment methods. The payment method includes the following: at least one processor of a payment system receives first identification data of a target vehicle from a road side unit of an electronic toll collection (ETC) system, where the first identification data includes identification information of the target vehicle; receives transaction data of a fuel dispenser, wherein the transaction data includes information from the fuel dispenser about a refueling fee of the target vehicle; obtains identity information of a payer that pays the fee; and transmits the identity information and the fee information to a target server.

In some embodiments, an on board unit of the ETC system is loaded on the target vehicle; and when the target vehicle passes the road side unit, the road side unit identifies a unit identifier of the on board unit, obtains the identification information of the target vehicle based on the identifier of the on board unit and transmits the identification information to the payment system.

In some embodiments, the payment method further includes the following: second identification data of the target vehicle from a second identification device is received, where the second identification data includes the identification information of the target vehicle; and the identification information in the first identification data is confirmed to be the same as the identification information in the second identification data.

In some embodiments, the second identification device includes an image recognition device; and the second identification data includes a visual identifier of the target vehicle.

In some embodiments, the step that the identity information of the payer is obtained includes the following: it is confirmed that a payment account is bound to the target vehicle based on the identification information of the target vehicle; and information about the payment account bound to the target vehicle is obtained based on the identification information.

In some embodiments, the step that the identity information of the payer is obtained includes the following: it is confirmed that no payment account is bound to the target vehicle based on the identification information of the target vehicle; and biometric data of a user of the target vehicle is scanned to obtain identity information of the user, where the identity information includes the biometric data.

In some embodiments, the payment method further includes the following: a target page is loaded, where the target page includes a target icon; and the target icon is triggered to activate a process of enabling a target payment service by the user.

In some embodiments, the biometric information includes one or more of facial feature data, iris feature data, fingerprint feature data, voice feature data, etc. of the user.

In some embodiments, the step that the identity information of the payer is obtained includes the following: it is confirmed that no payment account is bound to the target vehicle based on the identification information of the target vehicle; a target page is loaded, where the target page indicates a user of the target vehicle to enable a target payment service by using the user's end-user device; and payment account information of the user is obtained from the target server in response to enabling the target payment service by the user.

The present application further discloses a payment system, including: at least one memory including at least one group of instruction sets, and at least one processor communicably coupled to the at least one memory. When running the at least one group of instruction sets, the at least one processor performs the payment method of the present application.

The present application further discloses a service system, including a road side unit of an ETC system, configured to identify identification information of a target vehicle; a fuel dispenser, configured to refuel the target vehicle and generate refueling fee information; a payment system, configured to receive the identification information from the road side unit and the fee information from the fuel dispenser; and a target server, configured to transfer the fee from an account bound to the identification information to a target account based on the identification information and the fee information.

In some embodiments, an on board unit of the ETC system is loaded on the target vehicle; and when the target vehicle passes the road side unit, the road side unit identifies a unit identifier of the on board unit, obtains the identification information of the target vehicle based on the identifier of the on board unit and transmits the identification information to the payment system.

In some embodiments, the service system further includes a second identification device. The second identification device includes an image recognition device, and identifies the identification information of the target vehicle and transmits the identification information to the payment system.

The service system of the present application uses an identification system of an ETC system to obtain an identity of a vehicle. On one hand, the obtained identity of the vehicle is more accurate and reliable; on the other hand, rich vehicle attribute information can be obtained by using the ETC system.

The service system of the present application uses a third-party payment platform for settlement instead of a clearing and settlement system of the ETC system. Thus, a payment speed is increased; instant payment can be realized; payment convenience is improved; and application scenarios of the service system are expanded.

For the service system of the present application, a payment machine that can support face verification is externally connected to the fuel dispenser. The payment machine can be a standardized payment machine and can also perform data transmission with a road side unit (RSU) and a camera. Thus, a license plate number is obtained by using the RSU and the camera, and a payment account bound to the license plate number is further obtained. The payment machine only needs to obtain a bill amount from the fuel dispenser to generate complete billing information (including the license plate number, the bill amount, the payment account, etc.); and without needing to replace and upgrade the fuel dispenser, the payment machine can be widely popularized.

The payment method of the present application guides a user to resign a payment withholding agreement with the third-party payment platform; ETC identification is separated from ETC payment; an ETC clearing and settlement system in a highway scenario is abandoned; and a third-party electronic payment method with very high timeliness is resigned. The payment efficiency at gas stations is improved; and a user using electronic payment does not need to pay at the back hall. Moreover, accurate vehicle information is obtained through the ETC; and complete user profiles can be created, thereby expanding value-added services such as membership.

BRIEF DESCRIPTION OF DRAWINGS

FIG. 4E is a schematic diagram illustrating a paying and signing page, according to some embodiments of the present application;

FIG. 4F is a schematic diagram illustrating another paying and signing page, according to some embodiments of the present application;

DESCRIPTION OF EMBODIMENTS

Figure 1:
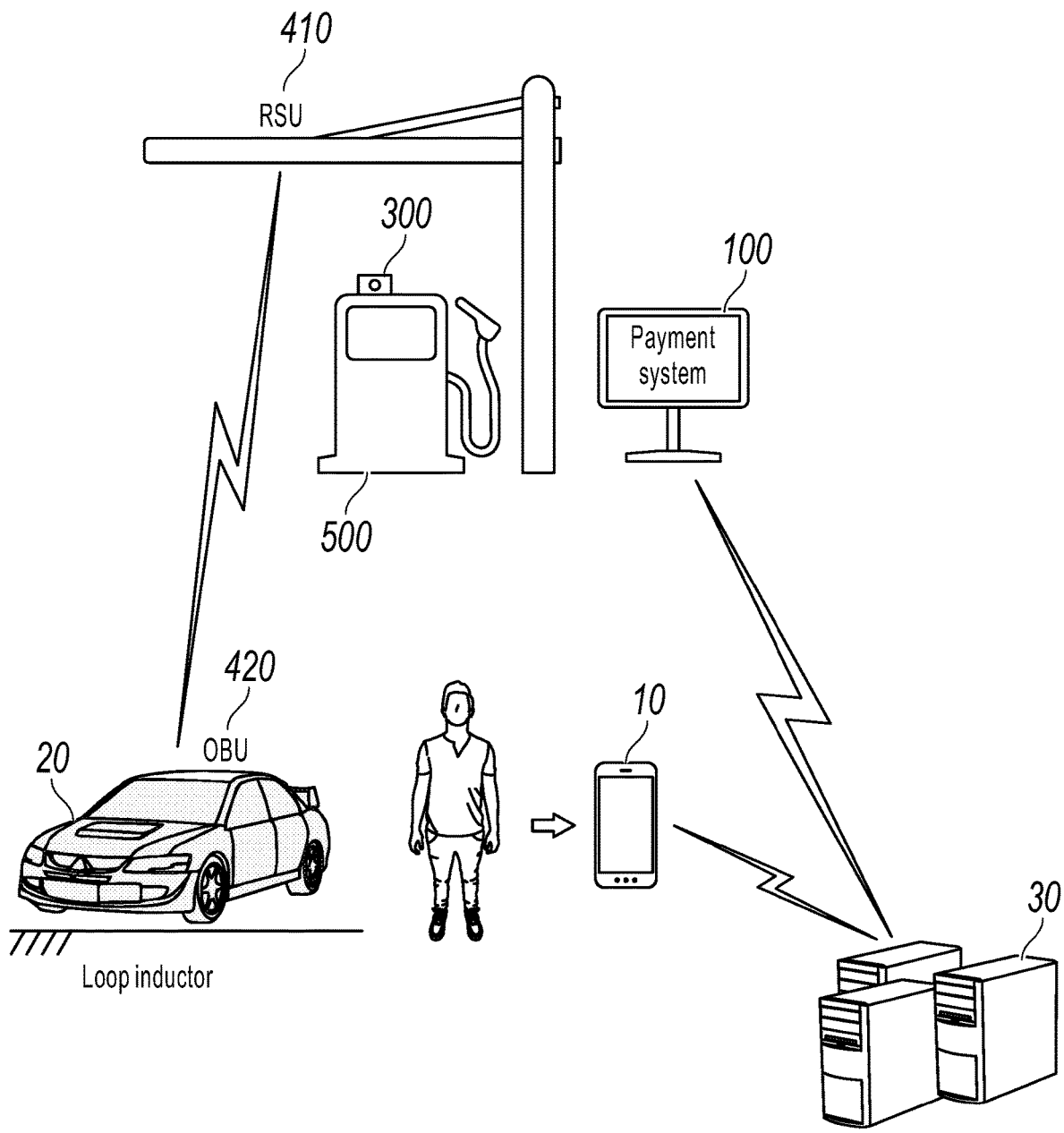
FIG. 1 is a schematic diagram illustrating an application scenario of a payment method, according to some embodiments of the present application.

The following description provides specific application scenarios and requirements of the present application, in order to enable those skilled in the art to make and use the content of the present application. Various modifications to the disclosed embodiments will be readily clear to those skilled in the art, and the generic principles defined here can be applied to other embodiments and applications without departing from the spirit and scope of the present application. Therefore, the present application is not limited to the described embodiments, but is to be accorded with a broadest scope consistent with the claims.

Terms used in the present application are merely used for describing purposes of specific example embodiments, but are not restrictive.

In view of the following descriptions, these features and other features of the present application, operations and functions of related elements of structures, and economic efficiency of combination and manufacture of components can be significantly improved. Referring to the drawings, all the above content forms one part of the present application. However, it should be clearly understood that the drawings are merely used for illustration and description, rather than limiting the scope of the present application.

The descriptions below can significantly improve these and other features of the present application, the operations and functions of the related elements of the structures, and the economic efficiency of combination and manufacture of the components. All the content forms one part of the present application by referring to the accompanying drawings. However, it should be clearly understood that the drawings are merely used for illustration and description, rather than limiting the scope of the present application. It should be further understood that the accompanying drawings are not drawn to scale.

Electronic toll collection (ETC) is a toll collection system widely applied to highway toll collection or bridge toll collection scenarios. The ETC is the most advanced toll collection system in the world, and one of the service functions of an intelligent transportation system. The ETC system is composed of a plurality of subsystems. The ETC system can include an ETC issuance system (issuer), an ETC blacklist system, an ETC accounting system (highway owner and operating company), an ETC clearing and settlement system, an ETC automatic vehicle identification system, a center management system, etc.

The ETC automatic vehicle identification system can be composed of an on board unit (OBU), a road side unit (RSU), a loop inductor, etc. The OBU stores identification information of a vehicle and is generally mounted on a front windshield of the vehicle; the RSU is mounted beside a toll station; and the loop inductor is mounted beneath ground of the car lane.

The center management system is provided with a large database that stores information of a large number of licensed vehicles and users. When a vehicle passes an entrance of a toll station, the loop inductor senses the vehicle, the RSU transmits an inquiry signal, the OBU responses, and then the RSU and the OBU perform two-way communication and data exchange. The center management system obtains the identification information of the vehicle. For example, information such as a vehicle ID and a vehicle model is compared with corresponding information in the database; and the management system is controlled to take different actions based on different situations, e.g., the clearing and settlement system is controlled to deduct the due toll from a prepayment account of the vehicle or transmit instructions to other auxiliary facilities to work.

An operating principle of the ETC system is as follows: through dedicated short range communication performed between the OBU mounted on the windshield of the vehicle and the RSU on the ETC lane of the toll station, background settlement is conducted by banks through a computer networking technology, thereby achieving an aim of paying the highway or bridge toll without stopping when the vehicle passes the highway or bridge toll station. The ETC has covered 200 million vehicle owners. The OBU is an on-board electronic tag of the national uniform standard, includes rich data of vehicles and vehicle owners, and has very high commercial value. After the OBU of the vehicle is recognized by the RSU in a highway scenario, due to the own weak clearing and settlement capacity of the ETC, the highway toll bill generally needs T+3 days to complete deduction. To ensure efficient commute (without toll stops), the ETC in the highway scenario uses a mode of first passing and then deducting the toll. In the highway scenario, if toll deduction fails, the bank will blacklist the user and the vehicle, and thus the vehicle cannot pass.

To solve defects of the conventional refueling payment solutions, the present application provides a refueling payment solution by using the ETC: The RSU is mounted in a gas station; the OBU is identified by the RSU; the clearing and settlement system in the highway scenario is used; and the user needs to sign a refueling withholding agreement when using the refueling method for the first time, and the fee is automatically deducted from a bank card bound for the ETC after successful refueling.

In the previous refueling solution, firstly, when a vehicle leaves, a deduction result cannot be confirmed at the gas station. Because per customer transaction for refueling is relatively high, if bad debt occurs, the gas station bears a very high capital loss risk, i.e., the previous refueling payment solution cannot realize real-time bill settlement or the operation of paying before leaving. Secondly, the withholding payment generally arrives within about T+3 days. Except for the gas stations owned by the ETC issuer, any other gas stations generally cannot accept long payment days lasting T+3 days.

In conclusion, because timeliness of an ETC payment cannot satisfy service needs of commercial situations, the ETC is only widely applied to highway toll collection and bridge toll collection scenarios at present, and is not expanded to other vehicle owner services having relatively strong commercial attributes.

To realize instant payment and timely payment arrival in the refueling scenario, the present application provides a payment method. FIG. 1 is a schematic diagram illustrating an application scenario of a payment method, according to some embodiments of the present application.

An on board unit 420 (OBU) is an important component of an ETC system. The OBU 420 is generally mounted on an inner side of a front windshield of a vehicle 20.

The OBU 420 can be an electronic tag. In some embodiments, the electronic tag is a single-chip electronic tag. The single-chip electronic tag includes an integrated circuit chip storing vehicle attributes (such as an identification code, etc.) and a small microwave transmitter. Attribute data of the vehicle stored in the integrated circuit chip can be written only once, and cannot be changed. In some embodiments, the electronic tag is a double-chip electronic tag. The double-chip electronic tag can include an intelligent card (IC) and an on-board microwave transceiver. The IC can include a micro CPU. The micro CPU has a certain capability to compute, process and store data. The IC can serve as the electronic tag, a credit card or a financial card. When the IC serves as an electronic tag, the IC needs to be inserted into the on-board microwave transceiver, and then the on-board microwave transceiver reads the vehicle attribute data in the IC. A road side unit 410 performs two-way communication with the on-board microwave transceiver by using a dedicated short range communications (DSRC) technology, and obtains the vehicle attribute data.

The OBU 420 can establish a microwave communication link with the road side unit 410 by using the DSRC technology. The road side unit 410 can perform two-way communication with the OBU 420 and obtain the vehicle attribute data stored in the OBU 420.

The road side unit (RSU) 410 is an important component of the ETC system. The RSU 410 is mounted on a road side. The RSU 410 is generally mounted right above the ETC lane with a height of 5.5 m. The RSU 410 communicates with the OBU 420 mounted on the vehicle 20 by using the DSRC technology. The RSU 410 further identifies an identity of the vehicle 20 by communicating with the OBU 420.

The RSU 410 generally includes a road side antenna and a radio frequency controller. The road side antenna can be a high-gain directional beam control read-write antenna. The road side antenna can be a microwave transceiver module, and is in charge of transmission/reception, modulation/demodulation, coding/decoding and encryption/decryption of signals and data. The radio frequency controller can be a module for controlling data transmission and reception and processing information received and transmitted by a host computer.

A fuel dispenser 500 is an oil transport metering device for directly refueling the vehicle 20. The fuel dispenser 500, together with an oil tank, a pipeline, pipe fitting valves, etc. forms the entire oil supply system. The fuel dispenser 500 comprises an oil pump, an oil-gas separator, a meter, a counter, a motor, an oil gun, etc. The fuel dispenser 500 can inject oil to the vehicle 20 through the oil gun. The fuel dispenser 500 can further obtain at least one of a current refueling quantity or refueling fee through the meter and the counter. The fuel dispenser 500 can transmit information on at least one of the current refueling quantity or fee to a payment system 100.

A camera 300 can obtain license plate information of the vehicle 20 and transmit the license plate information to the payment system 100. After receiving the license plate information, the payment system 100 can match the license plate information with the identity information of the vehicle 20 received from the RSU 410, so as to confirm the identity of the vehicle 20.

The payment system 100 can help a gas station collect the fee. The payment system 100 can include a payment machine. As an example, the payment machine can be a face recognition device. In some embodiments, the payment system 100 can further include a cashier center of a merchant connected with the payment machine. For ease of description, in the following description of the present application, functions of the payment system 100 are described by taking the payment machine as an example.

The payment system 100 can be connected with the fuel dispenser 500. The payment system 100 can receive information from the fuel dispenser 500 about the refueling fee. The payment system 100 is connected with the RSU 410.

The payment system 100 can receive the identity information of the vehicle 20 from the RSU 410. In some embodiments, the payment system 100 can request a server 30 to transfer a target amount of transaction fee from an account of a payer to an account of a merchant.

Figure 2:
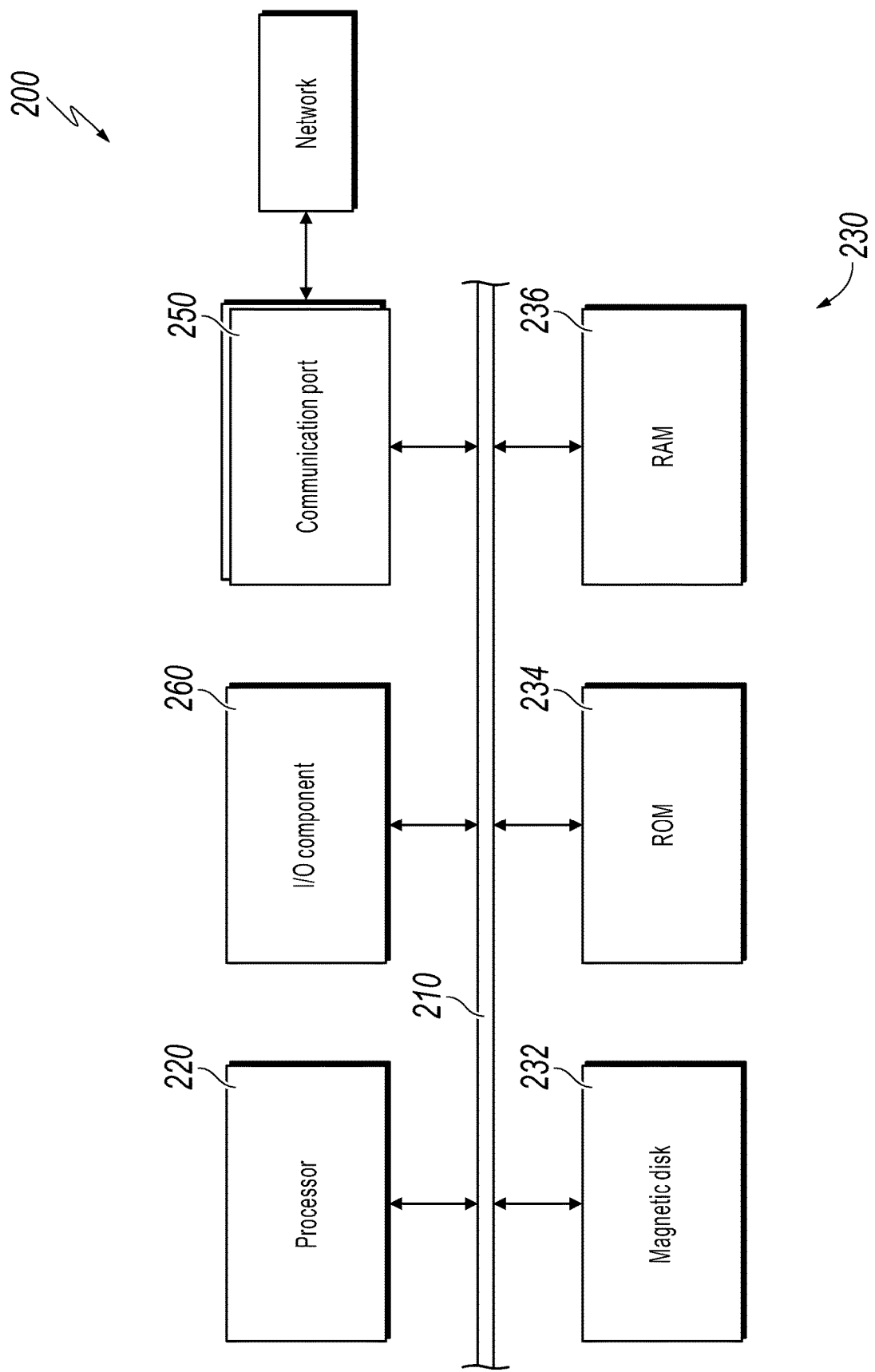
FIG. 2 is a schematic diagram illustrating a hardware structure of a payment system, according to some embodiments of the present application.

As an example, FIG. 2 is a schematic diagram illustrating a hardware structure of a payment system 100, according to some embodiments of the present application. The payment system 100 includes at least one memory 230 and at least one processor 220. In some embodiments, the payment system 100 can further include a communication port 250 and an internal communication bus 210. Meanwhile, the payment system 100 can further include an I/O component 260.

The internal communication bus 210 can be connected with different system components, including the memory 230 and the processor 220.

The I/O component 260 supports input/output between the payment system 100 and other components (such as an end-user device 10).

The memory 230 can include a data storage apparatus. The data storage apparatus can be a non-transitory storage medium or a transitory storage medium. For example, the data storage apparatus can include one or more of a magnetic disk 232, a read-only memory (ROM) 234 or a random access memory (RAM) 236. The memory 230 further includes at least one instruction set stored in the data storage apparatus. The instruction is computer program code; and the computer program code can include a program, a routine, an object, a component, a data structure, a procedure, a module, etc. that execute the information sending method provided by the present application.

The communication port 250 is used for data communication between the payment system 100 and outside world.

The at least one processor 220 communicates with the at least one memory 230 via the internal communication bus 210. The at least one processor 220 is used for executing the previous at least one instruction set. When the at least one processor 220 executes the previous at least one instruction set, the payment system 100 performs the payment method provided by the present application. The processor 220 can execute all the steps included in the payment method. The processor 220 can be in the form of one or more processors. In some embodiments, the processor 220 can include one or more hardware processors, such as a microcontroller, a microprocessor, a reduced instruction set computer (RISC), an application-specific integrated circuit (ASIC), an application-specific instruction set processor (ASIP), a central processing unit (CPU), a graphics processing unit (GPU), a physics processing unit (PPU), a microcontroller unit, a digital signal processor (DSP), a field-programmable gate array (FPGA), an advanced RISC machine (ARM), a programmable logic device (PLD), any circuit or processor that can execute one or more functions, or any combination of the previous components. For illustration purposes, only one processor 220 is described in the payment system 100 in the present application. However, it is worthwhile to note that the payment system 100 in the present application can further include a plurality of processors. Therefore, at least one of operations or method steps disclosed in the present application can be performed by one processor as mentioned in the present application, or can be performed by a combination of the plurality of processors. For example, if a step A and a step B are executed by the processor 220 of the payment system 100 in the present application, it shall be understood that the step A and the step B can also be executed by two different processors 220 together or separately (e.g., the step A is performed by the first processor, the step B is performed by the second processor, or the step A and the step B are performed by the first and second processors together).

The server 30 can be a server of a third-party payment platform. The third-party payment platform can provide payment solutions for the user and the gas station. Digital resource accounts of the user and merchant are set in the server 30. The server 30 can receive an instruction from the end-user device 10 of the user or the payment system 100, and transfer digital resources of a target amount between the account of the user and the account of the merchant based on the instruction.

The server 30 can receive and process a signing request of the payment system 100 or the end-user device 10. The server 30 can bind a payment account of a target user with an identifier of a target vehicle based on signing content. As an example, the identifier of the target vehicle can be its license plate number.

Figure 3A:
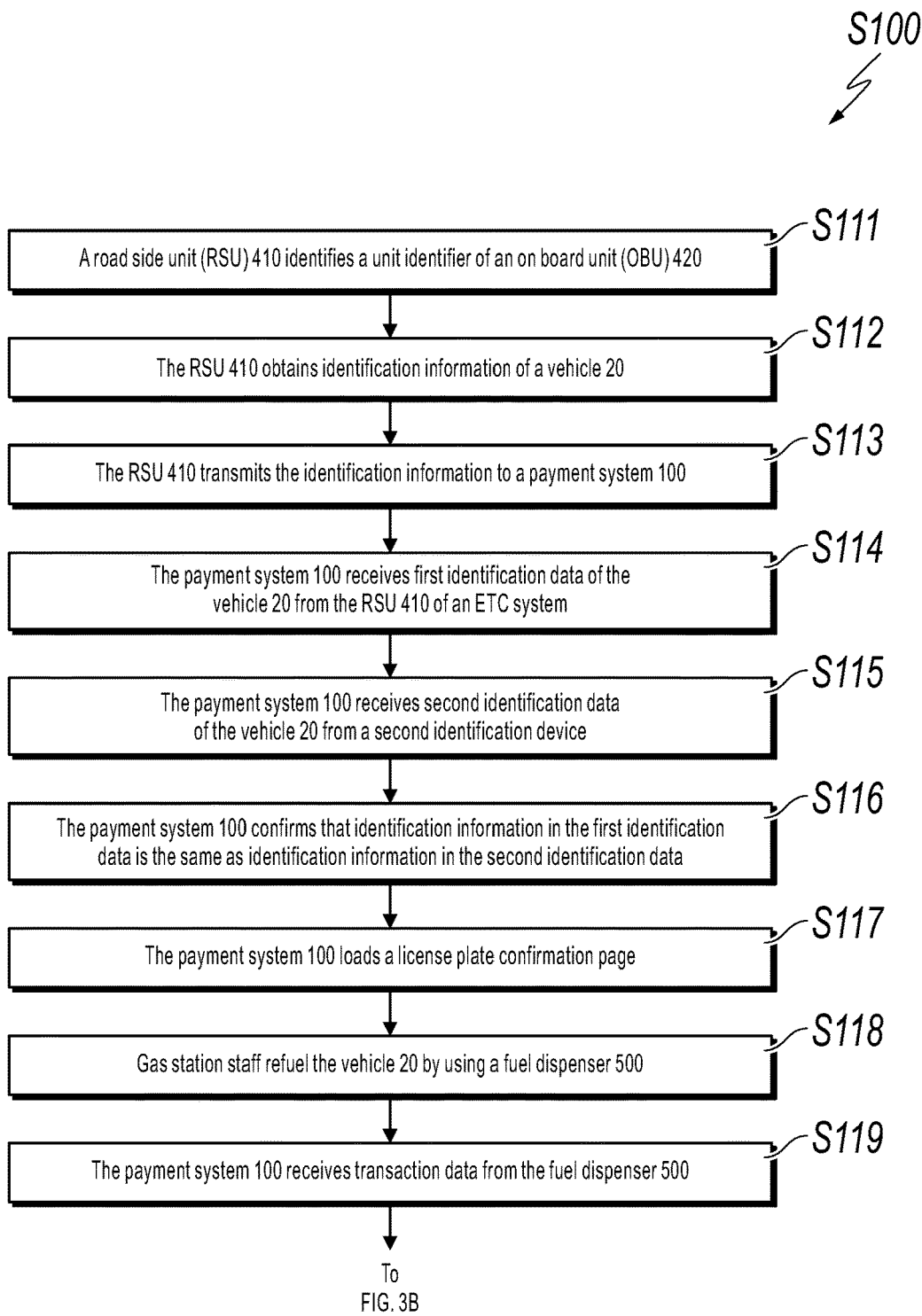
FIGS. 3A and 3B are flowcharts illustrating a payment method, according to some embodiments of the present application.
Figure 3B:
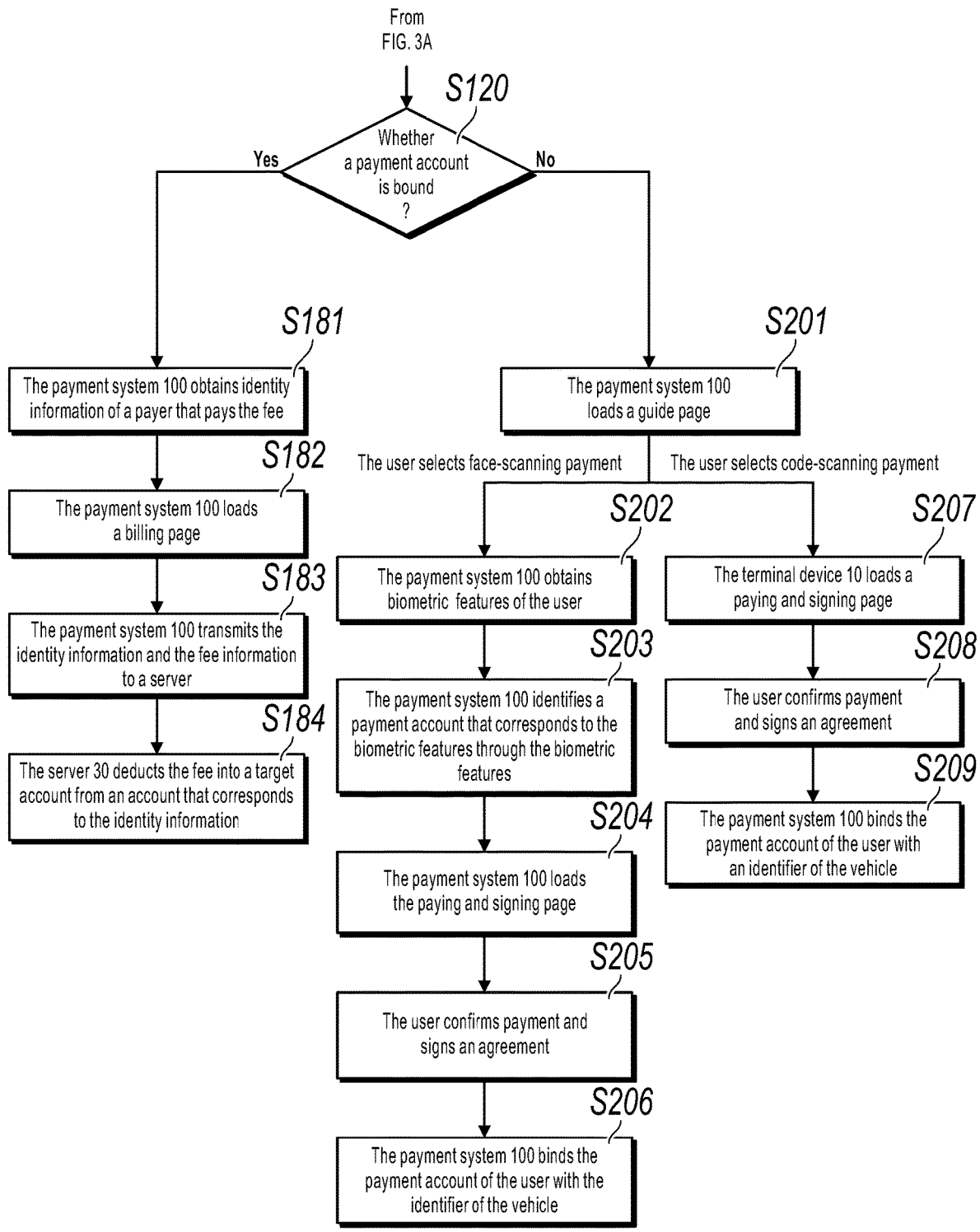

FIGS. 3A and 3B are flowcharts illustrating a payment method S100, according to some embodiments of the present application. Some steps of the process S100 can serve as at least one instruction set to be stored in the non-transitory storage medium of the payment system 100 (such as the memory 230). The at least one processor 220 is communicably coupled to the at least one non-transitory storage medium, where when the payment system 100 is running, the at least one processor 220 reads the at least one instruction set, and executes the some steps in the process S100 based on the instructions of the at least one instruction set.

The description below shows operations of the process S100, and is intended to be illustrative, rather than restrictive. In some embodiments, when the process S100 is implemented, one or more extra undescribed operations can be added, and/or one or more described operations can be deleted. In addition, sequences of the operations shown in FIGS. 3A and 3B and described below are not limited.

S111, the RSU 410 identifies a unit identifier of the OBU 420.

S112, the RSU 410 obtains identification information of the vehicle 20.

When the vehicle 20 mounted with the OBU 420 enters a communication range, a loop inductor buried underground will respond so as to start a read-write antenna in the RSU 410. The read-write antenna communicates with the OBU 420 in a microwave information exchange mode, and reads vehicle attribute information in the OBU 420. As an example, the vehicle attribute information in the OBU 420 includes an identifier, a model code, etc. of the vehicle 20. In some embodiments, after obtaining the information, the RSU 410 transmits the vehicle attribute information to a center management system; the center management system can determine the validity of the vehicle attribute information, e.g., the center management system determines whether the current vehicle 20 is a normal vehicle, or determines whether the current OBU 420 is effective; and the center management system can return a determining result to the RSU 410.

S113, the RSU 410 transmits the identification information to the payment system 100.

S114, the payment system 100 receives first identification data of the vehicle 20 from the RSU 410 of the ETC system.

The OBU 420 of the ETC system can be mounted on the vehicle 20. The first identification data can include the identifier, the model code, etc. of the vehicle 20.

When the RSU 410 determines from the center management system that the vehicle 20 is a normal vehicle and/or the current OBU 420 is effective, the RSU 410 can transmit identity information of the vehicle 20 to the payment system 100.

S115, the payment system 100 receives second identification data of the vehicle 20 from a second identification device.

In some embodiments, the second identification device can include an image recognition device. As an example, the image recognition device can include a camera 300. The second identification data includes a visual identifier of the vehicle 20. As an example, the second identification data can include license plate information of the vehicle 20. The camera 300 can be mounted above the fuel dispenser 500. After the vehicle 20 enters the gas station, the camera 300 can photograph the license plate information of the vehicle 20 and transmit the photographed license plate information to the payment system 100. After obtaining the license plate information from the camera 300, the payment system 100 can verify the identity information of the vehicle from the RSU 410 based on the license plate information, so as to reconfirm the identity of the vehicle 20. In some embodiments, the camera 300 can further photograph a location of the fuel dispenser 500 where the vehicle 20 is located, and transmit the location and the license plate information of the vehicle 20 to the payment system 100 together.

S116, the payment system 100 confirms that identification information in the first identification data is the same as identification information in the second identification data.

The payment system 100 confirms that the license plate information of the vehicle 20 from the RSU 410 matches the license plate information of the vehicle 20 from the camera 300. If the information is matched, the payment system 100 will determine that a transaction can be made with the current vehicle 20. As an example, the transaction is a refueling transaction.

On the contrary, if the payment system 100 confirms that the license plate information of the vehicle 20 from the RSU 410 is mismatched with the license plate information of the vehicle 20 from the camera 300, or confirms that the license plate information from the RSU 410 is invalid, the payment system 100 can give an alarm prompt.

S117, the payment system 100 loads a license plate confirmation page.

Figures 4A, 4B:
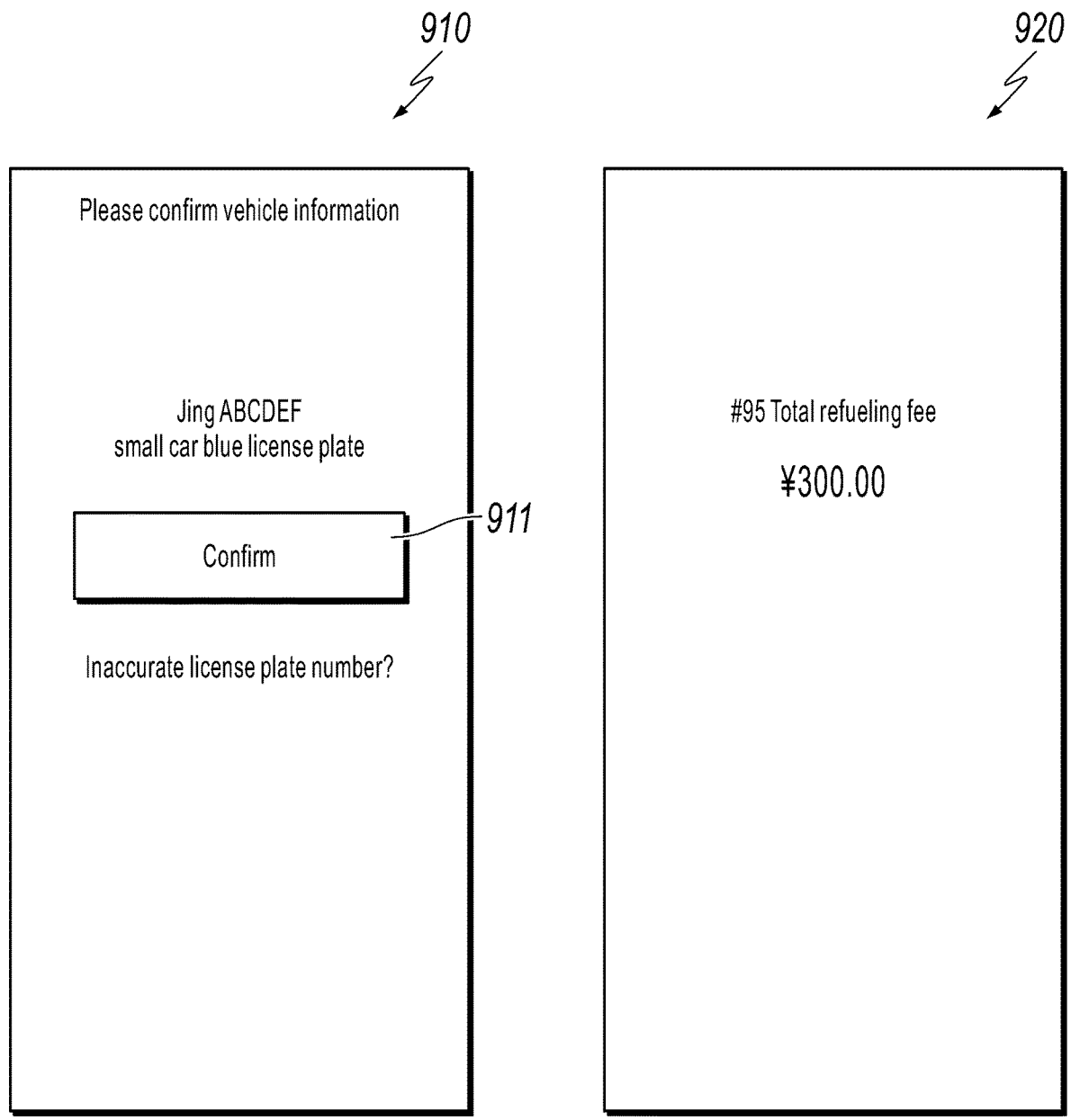
FIG. 4A is a schematic diagram illustrating a license plate confirmation page, according to some embodiments of the present application.
FIG. 4B is a schematic diagram illustrating a refueling bill page, according to some embodiments of the present application.

In some embodiments, the payment system 100 can load a page that includes the license plate information through a display device of the system. The user can further confirm the license plate information through the page. As an example, FIG. 4A is a schematic diagram illustrating a license plate confirmation page 910, according to some embodiments of the present application. Gas station staff can click on an icon 911 on the page 910 to confirm that the license plate information is correct. Certainly, in some embodiments, the payment system 100 does not need to load the license plate confirmation page.

S118, the gas station staff refuel the vehicle 20 through the fuel dispenser 500.

S119, the payment system 100 receives transaction data from the fuel dispenser 500.

The transaction data includes a refueling fee of the vehicle 20 from the fuel dispenser 500.

When the payment system 100 determines that the license plate information of the vehicle from the RSU 410 is matched with the license plate information of the vehicle from the camera 300, the payment system 100 will determine that a transaction can be made with the current vehicle 20.

The gas station staff can refuel the current vehicle 20 by using the fuel dispenser 500. The fuel dispenser 500 calculates the current refueling fee and transmits the fee information to the payment system 100.

S120, the payment system 100 determines whether the identification information is bound to a payment account.

As previously described, the payment system 100 obtains the license plate information of the current vehicle from the RSU 410. The payment system 100 first determines whether the current vehicle has signed an ETC withholding agreement, i.e., whether the current vehicle has been bound to a payment account.

In some embodiments, the payment system 100 can query the server 30 of the third-party payment platform about whether the current vehicle has been bound to a payment account. For example, the payment system 100 can transmit the license plate information of the vehicle to the server 30; and after obtaining the license plate information of the vehicle, the server 30 queries whether there is a payment account bound to the license plate.

S181, the payment system 100 obtains identity information of a payer that pays the fee.

S182, the payment system 100 loads a billing page.

S183, the payment system 100 transmits the identity information and the fee information to the server 30.

S184, the server 30 deducts the fee to a target account from an account that corresponds to the identity information.

The target account can include a fee collection account of the gas station. When confirming that the current vehicle is bound to a payment account, the payment system 100 obtains information of the payment account. In conclusion, the payment system 100 obtains the payment account information and the refueling fee information.

In some embodiments, after obtaining the payment account information and the refueling fee information, the payment system 100 can load a page that includes a refueling bill through the display device of the system. The user can further confirm the refueling bill through the page. As an example, FIG. 4B is a schematic diagram illustrating a refueling bill page 920, according to some embodiments of the present application. The refueling bill page 920 shows that the current refueling fee is 300 RMB.

The payment system 100 generates an order based on the payment account information and the fee information, and transmits a deduction request to the server 30 based on the order. The server 30 can directly transfer the digital resource of the target amount from the payment account to the fee collection account of the gas station based on the deduction request.

Then, the refueling transaction between the user and the gas station is completed.

Figures 4C, 4D:
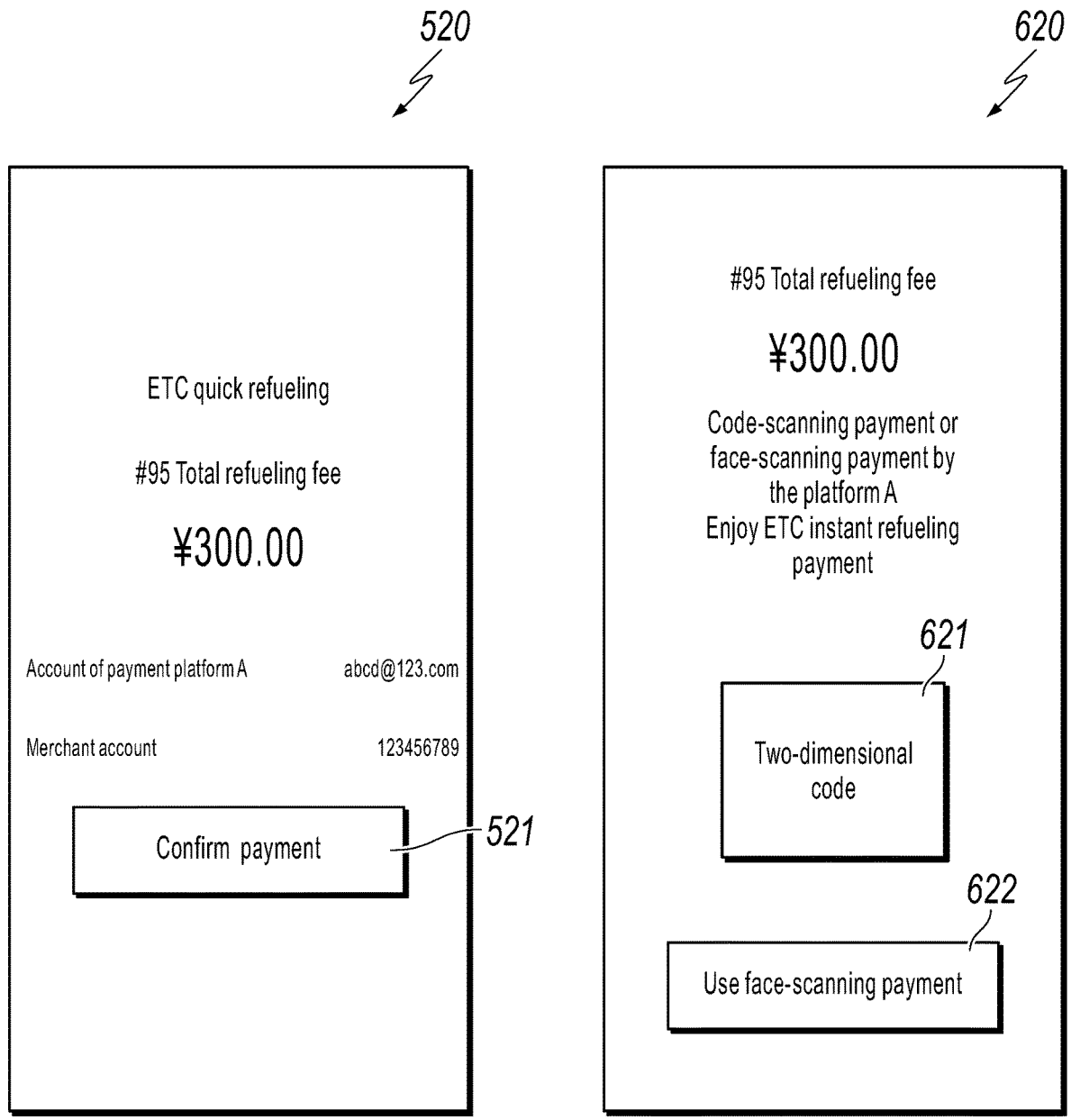
FIG. 4C is a schematic diagram illustrating a payment page, according to some embodiments of the present application.
FIG. 4D is a schematic diagram illustrating a guide page, according to some embodiments of the present application.

In some embodiments, when the refueling fee is relatively high, the server 30 can further send payment information to the end-user device 10 of the user. The end-user device 10 can load the payment page based on the payment information. The user can confirm to pay or not to pay through the payment page loaded by the end-user device 10, thereby further ensuring payment security. As an example, FIG. 4C is a schematic diagram illustrating a payment page 520, according to some embodiments of the present application. The user clicks on a payment confirmation icon 521 on the payment page 520; the end-user device 10 loads a payment password box; and then the user inputs the password into the payment password box so as to complete payment.

S201, the payment system 100 loads a guide page.

When confirming that the current vehicle is not bound to a payment account, the payment system 100 can guide the user to enable ETC instant payment through a page loaded by the display device of the system.

As an example, FIG. 4D is a schematic diagram illustrating a guide page 620. Meanwhile, bill information can be displayed on the guide page 620.

An icon 621 can be included on the guide page 620. The icon 621 can be a two-dimensional code. The icon 621 is used for guiding the user to scan the code for payment and to enable ETC instant payment. The user can scan the icon 621 by using the end-user device 10, and further activate a process of enabling ETC instant payment by using an account of the user on a payment platform A.

An icon 622 can be included on the guide page 620. The icon 622 is used for guiding the user to perform face-scanning payment and to enable ETC instant payment. When the user clicks on the icon 622, the payment system 100 can activate its biometric features reading device. As an example, the biometric features reading device can include but is not limited to a camera, a fingerprint reader, etc. mounted in the payment system 100.

S202, the payment system 100 obtains biometric features of the user.

S203, the payment system 100 identifies a payment account that corresponds to the biometric features through the biometric features.

S204, the payment system 100 loads a paying and signing page.

S205, the user confirms payment and signs an agreement.

S206, the payment system 100 binds the payment account of the user with the identifier of the vehicle.

Continue to refer to FIG. 4D, the user clicks on the icon 622 on the page 620, i.e., the user selects the face-scanning payment. The payment system 100 reads the biometric features of the user through the reading device. As an example, the reading device can be a scanning device integrated in the payment system 100. The user uploads the user's biometric features to the payment system 100 through the reading device. The payment system 100 obtains the biometric features of the user through the reading device. As an example, the biometric features can include but are not limited to facial feature data, iris feature data, fingerprint feature data, voice feature data, etc. of the user. For ease of description, in the descriptions of the present application, the functions of the biometric features are described by taking the facial features as an example.

When facial recognition succeeds, the payment system 100 obtains a payment account that corresponds to the facial features based on the obtained facial features.

After obtaining the payment account, the payment system 100 can load the paying and signing page through the display device of the system (such as a display of the payment machine), so as to guide the user to sign ETC instant payment. As an example, FIG. 4E is a schematic diagram illustrating a paying and signing page 450, according to some embodiments of the present application. The user can click on an agree-and-pay icon 451 and activate a process of enabling ETC instant payment.

The user clicks on the agree-and-pay icon 451; the payment system 100 loads a payment password box through the display device of the system (such as the display of the payment machine); and then the user inputs the payment password into the payment password box so as to enable ETC instant payment. The payment platform A binds the account of the user on the payment platform A with the license plate identifier. When the current vehicle performs ETC refueling next time, the payment system 100 can directly deduct the refueling fee from the payment account of the user to the account of the gas station based on the bound account.

S207, the end-user device 10 loads the paying and signing page.

S208, the user confirms payment and signs an agreement.

S209, the payment system 100 binds the payment account of the user with the identifier of the vehicle.

Continue to refer to FIG. 4D, the user can scan the icon 621 on the page 620 by using the end-user device 10, i.e., the user selects the code-scanning payment.

After obtaining the information included in the icon 621, the end-user device 10 reads the payment account of the user on the payment platform A, and jumps to the paying and signing page, so as to guide the user to sign ETC instant payment. As an example, FIG. 4F is a schematic diagram illustrating a paying and signing page 460, according to some embodiments of the present application. The page 460 is displayed on a display screen of the end-user device 10. The user can click on an agree-and-pay icon 461 and activate a process of enabling ETC instant payment.

The user clicks on the agree-and-pay icon 461; the end-user device 10 loads a payment password box; and the user inputs the payment password into the payment password box so as to enable ETC instant payment. The payment platform A binds the account of the user on the payment platform A with the license plate identifier. When the current vehicle performs ETC refueling next time, the payment system 100 can obtain the payment account information bound to the license plate information from the payment platform A. The payment platform A can directly deduct the refueling fee from the payment account of the user to the account of the gas station based on the bound account.

Figure 5:
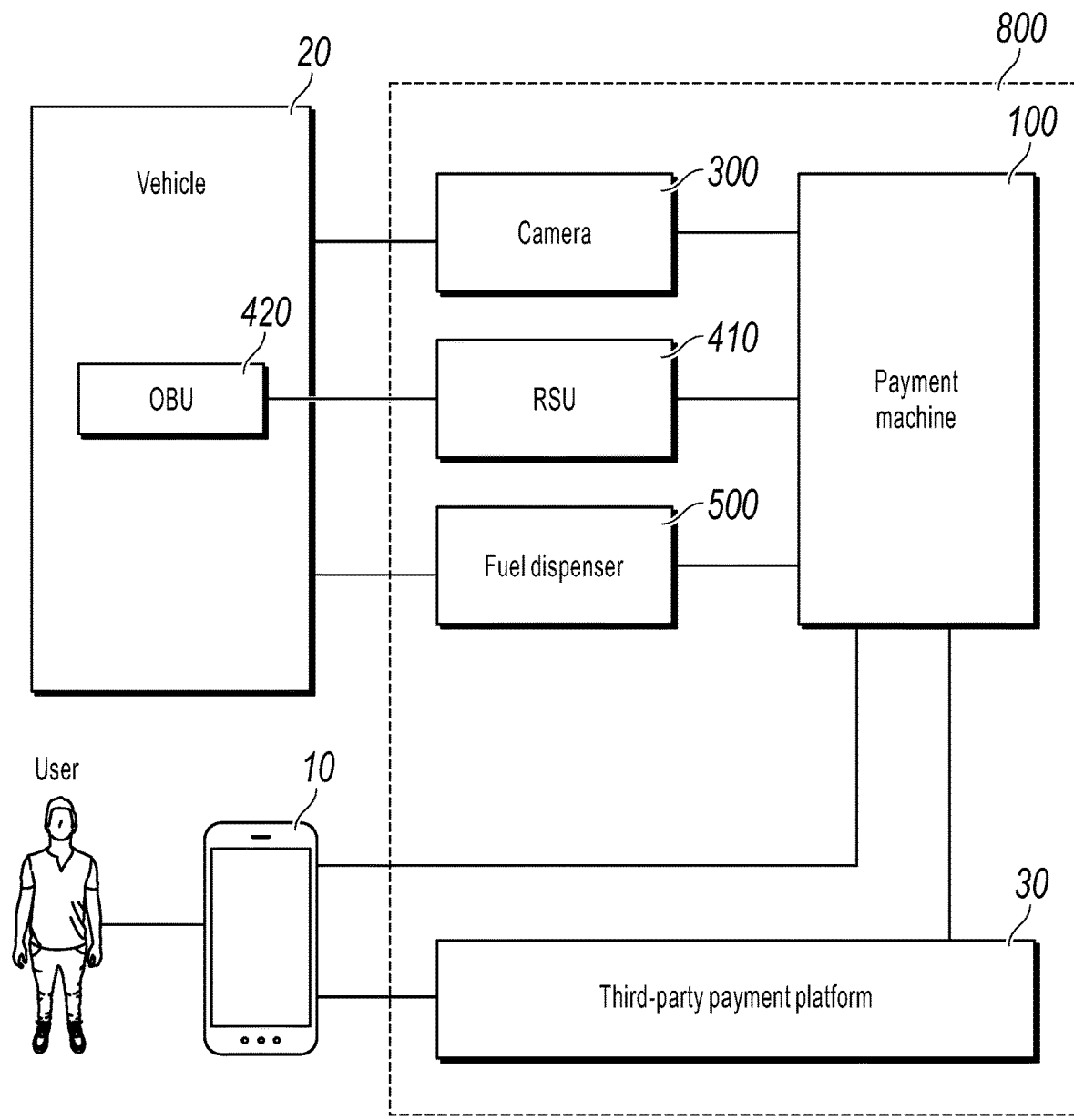
FIG. 5 is a schematic structural diagram illustrating a service system, according to some embodiments of the present application.

The present application further provides a service system. As an example, FIG. 5 is a schematic structural diagram illustrating a service system 800, according to some embodiments of the present application. Specifically, the service system 800 can include an RSU 410 of an ETC system, a fuel dispenser 500, a server 30 and the payment system 100 in the present application.

The RSU 410 of the ETC system can identify identification information of a vehicle 20; the fuel dispenser 500 can refuel the vehicle 20 and generate a refueling fee; the payment system 100 can receive the identification information from the RSU 410 and the fee information from the fuel dispenser 500; and the server 30 can transfer the fee from an account bound to the identification information to an account of a gas station based on the identification information and the fee information. In some embodiments, the service system 800 can further include a second identification device. As an example, the second identification device can be a camera 300 mounted above the fuel dispenser 500. The second identification device can identify the identification information of the vehicle 20 and transmit the identification information to the payment system 100.

For specific structures and functions of each part of the service system 800, references can be made to the previous descriptions. Details are omitted here for simplicity.

Figure 6:
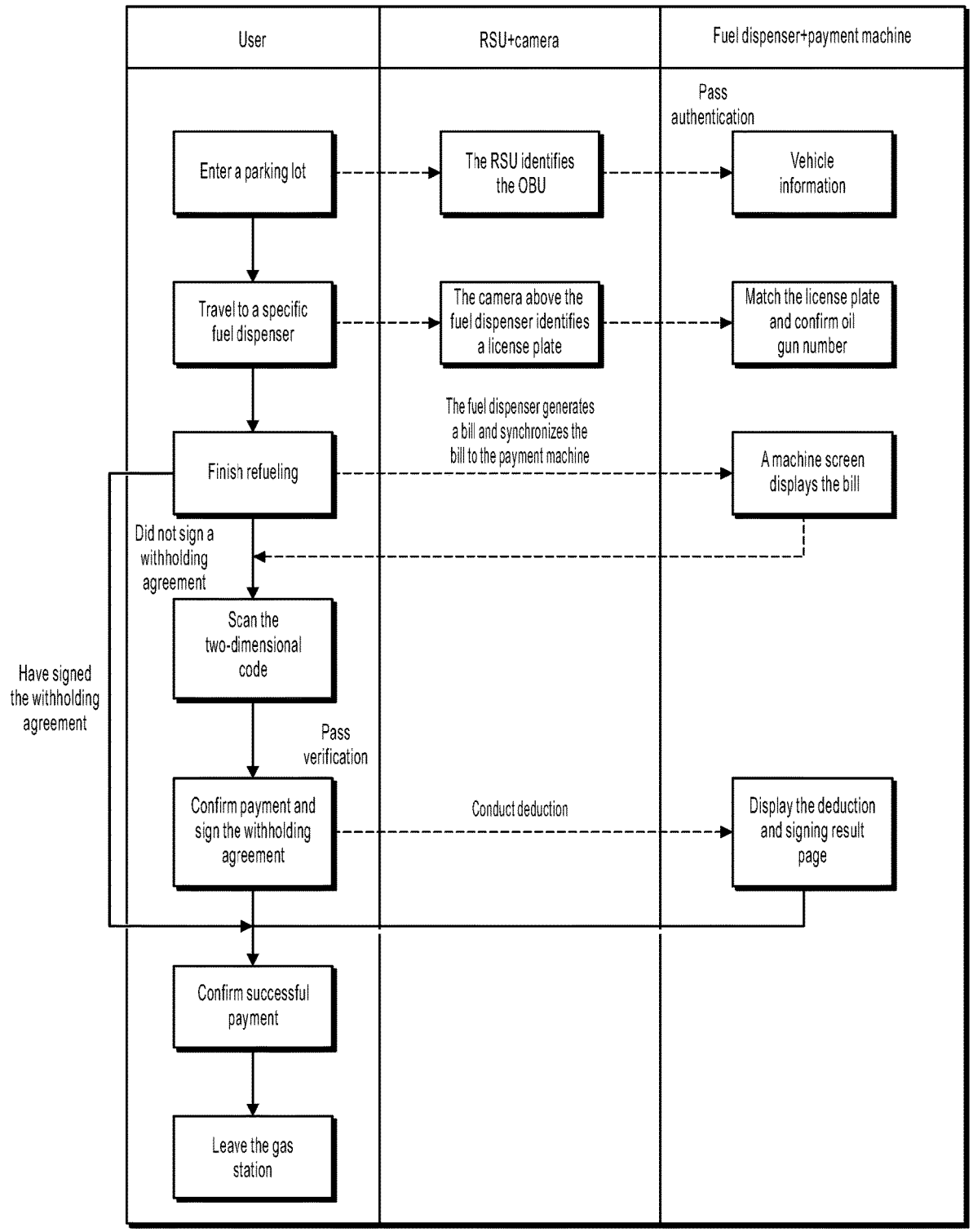
FIG. 6 is a process schematic diagram illustrating a payment method, according to some embodiments of the present application.

The payment method and the service system of the present application are further described in FIG. 6.

When a vehicle 20 mounted with an OBU 420 enters a communication range, an RSU 410 can communicate with the OBU 420 and read vehicle attribute information in the OBU 420. The RSU 410 can transmit the vehicle attribute information to a payment system 100.

When the vehicle 20 is in front of a specific fuel dispenser, a camera 300 above the fuel dispenser 500 obtains license plate information of the vehicle 20 by using an image recognition method and transmits the license plate information to the payment system 100.

The payment system 100 matches the received license plate information from the RSU 410 and the license plate information from the camera 300. After the information is matched, the payment system 100 can load a page that includes the license plate information on a display device of the system. A user can further confirm the license plate through the page.

When the user confirms that the license plate information is correct, gas station staff can refuel the vehicle 20 by using the fuel dispenser 500. After refueling is finished, the fuel dispenser 500 calculates the current refueling fee and transmits the fee information to the payment system 100.

After the payment system 100 receives the fee information from the fuel dispenser 500, a billing page can be loaded on the display device of the system.

The payment system 100 queries a server 30 of a third-party payment platform about whether the current license plate is bound to a payment account.

If the current license plate is not bound to a payment account, the payment system 100 can load a guide page to guide the user to pay the current bill by face-scanning payment or code-scanning payment and to enable ETC instant payment. After the user enables ETC instant payment, the server 30 binds the payment account of the user with the license plate of the vehicle 20. When the vehicle 20 is refueled at a gas station next time, the payment system 100 can deduct the refueling fee from the bound payment account.

If the current license plate has been bound to a payment account, the payment system 100 obtains the payment account based the license plate information, transmits the payment account and the current refueling fee information to the server 30, and transmits a request to the server 30 for deducting the refueling fee from the account of the payment account to a merchant account. If the refueling fee is high, the server 30 can send a payment confirmation page to an end-user device 10 of the user, and then the user can finish payment through the payment confirmation page loaded by the end-user device 10.

In conclusion, the present application provides the payment method, the payment system and the service system.

The service system of the present application uses an identification system of an ETC system to obtain an identity of a vehicle. On one hand, the obtained identity of the vehicle is more accurate and reliable; on the other hand, rich vehicle attribute information can be obtained by using the ETC system.

The service system of the present application uses a third-party payment platform for settlement instead of a clearing and settlement system of the ETC system. Thus, a payment speed is increased; instant payment can be realized; payment convenience is improved; and application scenarios of the service system are expanded.

For the service system of the present application, a payment machine that can support face verification is externally connected to the fuel dispenser. The payment machine can be a standardized payment machine and can also perform data transmission with a road side unit (RSU) and a camera. Thus, a license plate number is obtained by using the RSU and the camera, and a payment account bound to the license plate number is further obtained. The payment machine only needs to obtain a bill amount from the fuel dispenser to generate complete billing information (including the license plate number, the bill amount, the payment account, etc.); and without needing to replace and upgrade the fuel dispenser, the payment machine can be widely popularized.

The payment method of the present application guides a user to resign a payment withholding agreement with the third-party payment platform; ETC identification is separated from ETC payment; an ETC clearing and settlement system in a highway scenario is abandoned; and a third-party electronic payment method with very high timeliness is resigned. The payment efficiency at gas stations is improved; and a user using electronic payment does not need to pay at the back hall. Moreover, correct vehicle information is obtained through the ETC; and complete user profiles can be created, thereby expanding value-added services such as membership.

In conclusion, after reading the detailed content, the person skilled in the art can understand that the previous detailed content can be illustratively shown, and cannot be restrictive. Although the present application is not clearly stated, the person skilled in the art can understand that the present application is intended to include various reasonable changes, improvements and modifications to the embodiments. These changes, improvements and modifications are intended to be provided by the present application, and fall within the spirit and scope of the illustrative embodiments of the present application.

In addition, some terms in the present application have been applied to describing the embodiments of the present application. For example, "one embodiment", "embodiments" and/or "some embodiments" mean that specific features, structures or characteristics described in combination with the present embodiments can be included in at least one embodiment of the present application. Therefore, it can be emphasized and shall be understood that two or more references to the "embodiments" or "one embodiment" or "alternative embodiments" in various parts of the present specification do not always refer to the same embodiment. In addition, the specific features, structures or characteristics can be properly combined in one or more embodiments of the present application.

It should be understood that in the previous descriptions of the embodiments of the present application, to help understand one feature and for the purpose of simplifying the present application, sometimes the present application combines various features into a single embodiment, drawing, or a description of the embodiment or drawing. Or, the present application disperses various features in the multiple embodiments of the present application. However, it does not mean that the combination of these features is necessary. It is entirely possible for those skilled in the art to extract some of the features as a separate embodiment when reading the present application. That is, the embodiments in the present application can also be understood as an integration of a plurality of sub-embodiments. It is also logical when the content of each sub-embodiment is less than all the features of a single previous disclosed embodiment.

In some implementations, numbers that express the quantities or properties used for describing and protecting some implementations of the present application shall be understood to be modified by terms such as "about", "approximately" or "basically" in some situations. For example, unless otherwise stated, the terms such as "about", "approximately" or "basically" can represent ±20% variation of the described value. Therefore, in some implementations, numerical parameters listed in written descriptions and the claims are approximate values, and can be changed based on needed properties that are intended to be obtained by specific implementations. In some implementations, the numerical parameters shall be explained based on quantities of reported significant figures and through a commonly applied rounding technique. Although numerical ranges and parameters of broad scopes listed for describing some implementations of the present application are approximate values, the numerical values are listed in the specific embodiments as accurate as possible.

Each patent, patent applications, publications of the patent applications and other materials cited in the present application, such as articles, books, specifications, publications, documents, materials, etc., can be incorporated here by references. In the entire content used for all purposes, except for any related litigation document history, any identical litigation document history that may be inconsistent or conflicting with this document, or any identical litigation document history that may have restrictive influence on the widest scope of the claims, are associated with this document now or in the future. For example, if there is any inconsistency or conflict between the description, definition and/or use of the terms associated with any material included and the description, definition and/or use of the terms related to this document, the terms in this document shall prevail.

Finally, it shall be understood that the implementations of the present application are illustrative of the principles of the implementations of the present application. Other modified embodiments are also within the scope of the present application. Therefore, the embodiments disclosed in the present application are to be considered as illustrative and not restrictive. Those skilled in the art can implement the application in the present application by use of alternative configurations based on the embodiments of the present application. Therefore, the embodiments of the present application are not limited to those accurately described embodiments in the application.

What is claimed is:

1. A computer-implemented method, comprising:
    receiving, from a road side unit of an electronic toll collection (ETC) system, first identification data of a vehicle, wherein the first identification data is obtained by the road side unit via a direct communication link from an on board unit installed on the vehicle, and wherein the first identification data comprises identification information of the vehicle;
    receiving second identification data of the vehicle from an image recognition device, wherein the second identification data comprises a visual identifier of the vehicle;
    determining that the first identification data matches the second identification data;
    receiving transaction data from a fuel dispenser, wherein the transaction data comprises information determined based on the fuel dispenser of a refueling fee of the vehicle;
    determining identity information of an owner of the vehicle; and
    transmitting the identity information and the information of the refueling fee to a server.

2. The computer-implemented method according to claim 1, wherein the on board unit is paired with the ETC system, and comprising:
    determining that the vehicle passes the road side unit;
    identifying a unit identifier of the on board unit via the direct communication link;
    determining the identification information of the vehicle by reading the identification information of the vehicle stored in an integrated circuit chip of the on board unit; and
    transmitting the identification information to a payment system.

3. The computer-implemented method according to claim 1, wherein determining the identity information of the owner comprises:
    determining that a payment account is associated with the vehicle based on the identification information of the vehicle; and
    determining the identity information of the owner based on the payment account.

4. The computer-implemented method according to claim 1, wherein determining the identity information of the owner comprises:
    determining that no payment account is associated with the vehicle based on the identification information of the vehicle; and
    obtaining biometric data of the owner as at least a portion of the identity information.

5. The computer-implemented method according to claim 4, wherein the biometric data comprises data associated with one or more of facial features, iris features, fingerprint features, or voice features associated with the owner.

6. The computer-implemented method according to claim 1, wherein obtaining the identity information of the owner comprises:
    determining that no payment account is associated with the vehicle based on the identification information of the vehicle;
    presenting a user interface on a user-side device for the owner to enable a payment service; and
    obtaining payment account information of the owner from the server in response to the payment service being enabled.

7. A non-transitory, computer-readable medium storing one or more instructions executable by a computer system to perform operations comprising:
    receiving, from a road side unit of an electronic toll collection (ETC) system, first identification data of a vehicle, wherein the first identification data is obtained by the road side unit via a direct communication link from an on board unit installed on the vehicle, and wherein the first identification data comprises identification information of the vehicle;
    receiving second identification data of the vehicle from an image recognition device, wherein the second identification data comprises a visual identifier of the vehicle;
    determining that the first identification data matches the second identification data;
    receiving transaction data from a fuel dispenser, wherein the transaction data comprises information determined based on the fuel dispenser of a refueling fee of the vehicle;
    determining identity information of an owner of the vehicle; and
    transmitting the identity information and the information of the refueling fee to a server.

8. The non-transitory, computer-readable medium according to claim 7, wherein the on board unit is paired with the ETC system, and comprising:
    determining that the vehicle passes the road side unit;
    identifying a unit identifier of the on board unit via the direct communication link;

determining the identification information of the vehicle by reading the identification information of the vehicle stored in an integrated circuit chip of the on board unit; and transmitting the identification information to a payment system.

9. The non-transitory, computer-readable medium according to claim 7, wherein determining the identity information of the owner comprises:

determining that a payment account is associated with the vehicle based on the identification information of the vehicle; and determining the identity information of the owner based on the payment account.

10. The non-transitory, computer-readable medium according to claim 7, wherein determining the identity information of the owner comprises:

determining that no payment account is associated with the vehicle based on the identification information of the vehicle; and obtaining biometric data of the owner as at least a portion of the identity information.

11. The non-transitory, computer-readable medium according to claim 10, wherein the biometric data comprises data associated with one or more of facial features, iris features, fingerprint features, or voice features associated with the owner.

12. The non-transitory, computer-readable medium according to claim 7, wherein obtaining the identity information of the owner comprises:

determining that no payment account is associated with the vehicle based on the identification information of the vehicle;

presenting a user interface on a user-side device for the owner to enable a payment service; and obtaining payment account information of the owner from the server in response to the payment service being enabled.

13. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving, from a road side unit of an electronic toll collection (ETC) system, first identification data of a vehicle, wherein the first identification data is obtained by the road side unit via a direct communication link from an on board unit installed on the vehicle, and wherein the first identification data comprises identification information of the vehicle;

receiving second identification data of the vehicle from an image recognition device, wherein the second identification data comprises a visual identifier of the vehicle;

determining that the first identification data matches the second identification data;

receiving transaction data from a fuel dispenser, wherein the transaction data comprises information determined based on the fuel dispenser of a refueling fee of the vehicle;

determining identity information of an owner of the vehicle; and transmitting the identity information and the information of the refueling fee to a server.

14. The computer-implemented system according to claim 13, wherein the on board unit is paired with the ETC system, and comprising:

determining that the vehicle passes the road side unit;

identifying a unit identifier of the on board unit via the direct communication link;

determining the identification information of the vehicle by reading the identification information of the vehicle stored in an integrated circuit chip of the on board unit; and transmitting the identification information to a payment system.

15. The computer-implemented system according to claim 13, wherein determining the identity information of the owner comprises:

determining that a payment account is associated with the vehicle based on the identification information of the vehicle; and determining the identity information of the owner based on the payment account.

16. The computer-implemented system according to claim 13, wherein determining the identity information of the owner comprises:

determining that no payment account is associated with the vehicle based on the identification information of the vehicle; and obtaining biometric data of the owner as at least a portion of the identity information.

17. The computer-implemented system according to claim 16, wherein the biometric data comprises data associated with one or more of facial features, iris features, fingerprint features, or voice features associated with the owner.

* * * * *